May 12, 1953    L. H. BROWNE    2,638,264
UNLOADER FOR FLUID COMPRESSORS
Original Filed March 2, 1948    3 Sheets-Sheet 1

INVENTOR.
LINDSAY H. BROWNE
BY Wallace and Cannon
ATTYS.

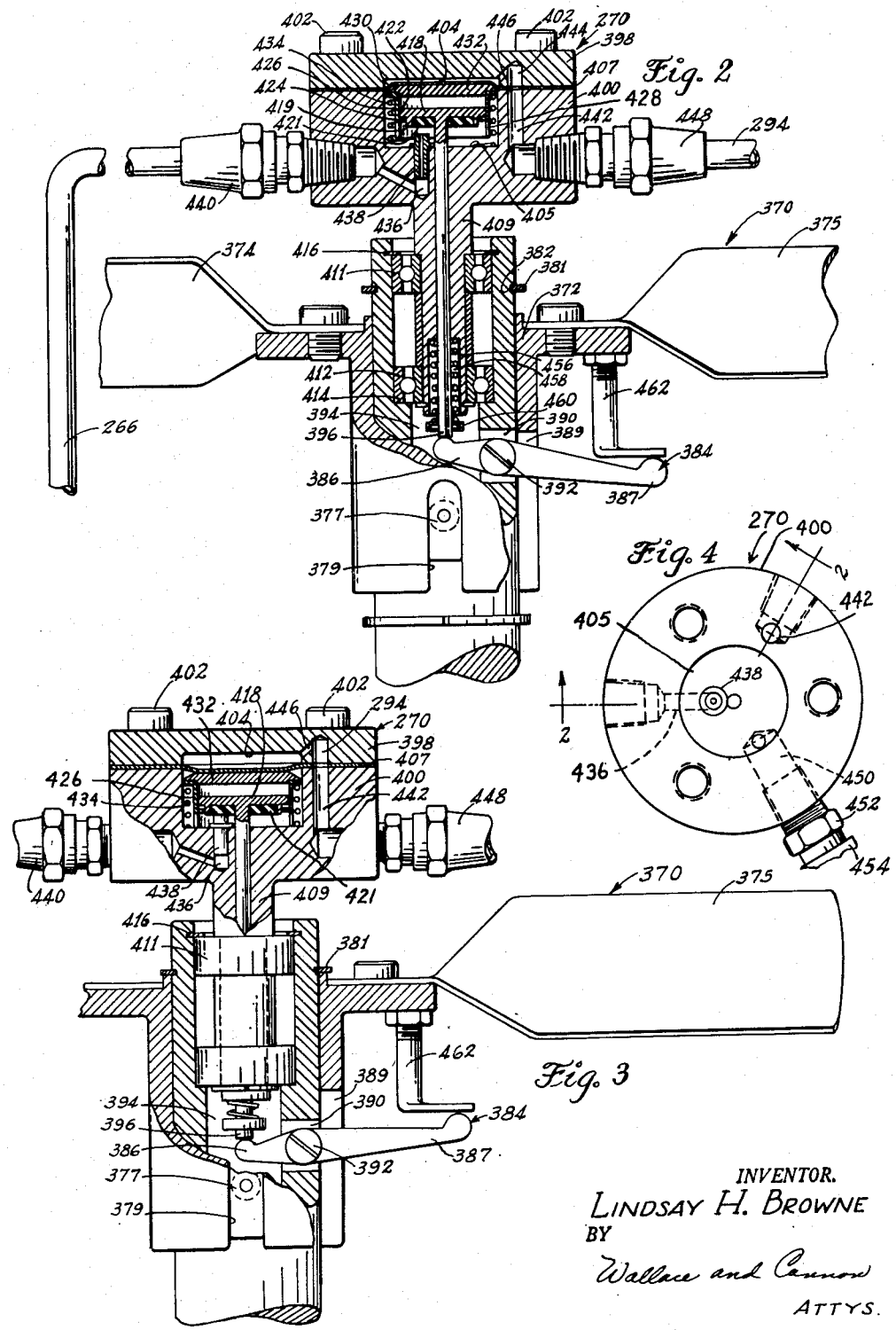

May 12, 1953 L. H. BROWNE 2,638,264
UNLOADER FOR FLUID COMPRESSORS
Original Filed March 2, 1948 3 Sheets-Sheet 3
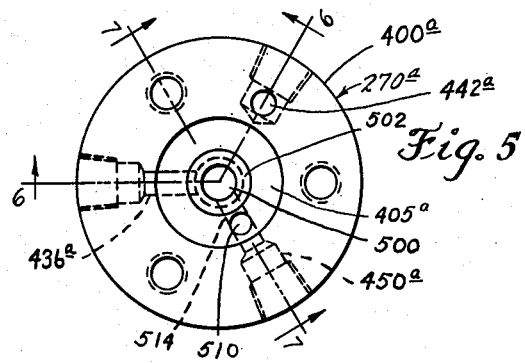
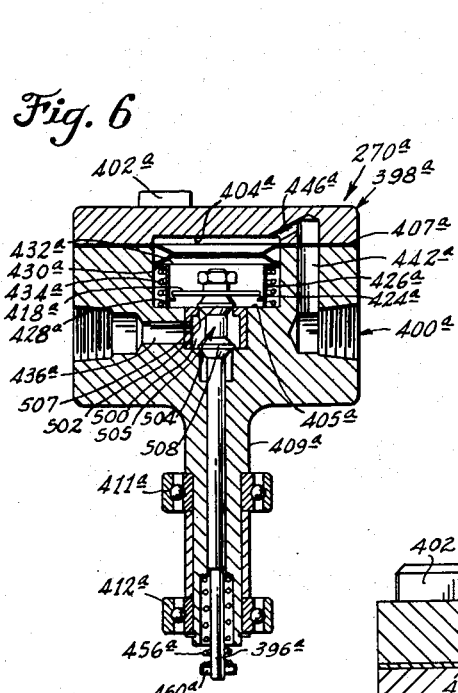
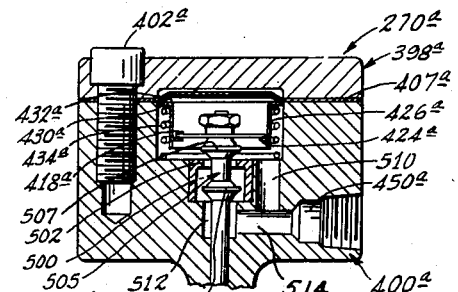
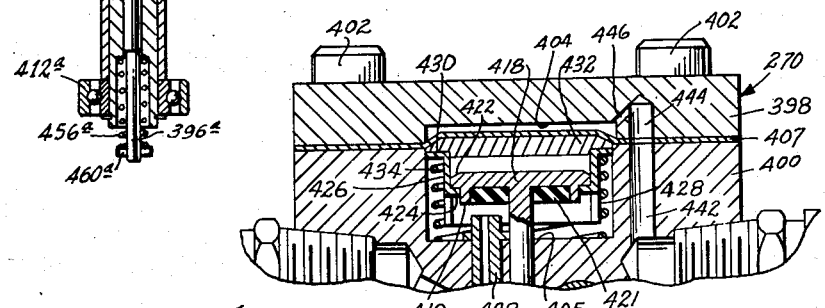
INVENTOR.
LINDSAY H. BROWNE
BY
Wallace and Cannon
ATTYS.

Patented May 12, 1953

2,638,264

UNITED STATES PATENT OFFICE 2,638,264

UNLOADER FOR FLUID COMPRESSORS

Lindsay H. Browne, Weston, Conn., assignor to American Brake Shoe Company, Wilmington, Del., a corporation of Delaware Original application March 2, 1948, Serial No. 12,610. Divided and this application March 16, 1951, Serial No. 215,977

7 Claims. (Cl. 230—7)

This application is a division of my co-pending application, Serial No. 12,610, filed March 2, 1948.

This invention relates to unloaders for fluid compressors, such as air compressors, and the primary object of my invention is to afford an unloader which will not only be effective during the start of operation of the compressor with which it is associated, but also will become effective in the event of improper operation of the compressor, such as a reduction in the speed thereof or failure of the lubricating system thereof.

Other objects of this invention are to associate a novel unloader with a compressor embodying a forced feed lubricating system and to connect the unloader to the lubricating system in such a way that pressure failure in the lubricating system will cause the unloader to effect its unloading function; to associate an unloader with rotative parts of a compressor in such a way that when the compressor is operating at its proper, normal speed, the attendant forces will be effective to prevent the unloader from effecting its unloading; and to associate a novel unloader with a fan that is set in operation upon operation of the compressor whereby the operation of the fan will be effective to control operation of the novel unloader.

A yet further object of this invention is to provide a novel unloader of simple and economical construction and which will be efficient and positive in operation.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 2 is a vertical sectional view through one form of my novel unloader and showing the same in condition to effect unloading of the associated compressor, and taken substantially on the line 2—2 on Fig. 4;

Fig. 3 is a view similar to Fig. 2, but showing the unloader in condition to prevent unloading of the compressor;

Fig. 4 is a plan view of the unloader as shown in Fig. 2;

Fig. 5 is a plan view of a modified form of my novel unloader;

Fig. 6 is a view similar to Fig. 2, but showing the modified form of my unloader that is illustrated in Fig. 5;

Fig. 7 is another vertical sectional view of the unloader shown in Figs. 5 and 6, and taken substantially on the line 7—7 on Fig. 5; and Fig. 8 is an enlarged detail view of a portion of the unloader shown in Fig. 2.

Figure 1:
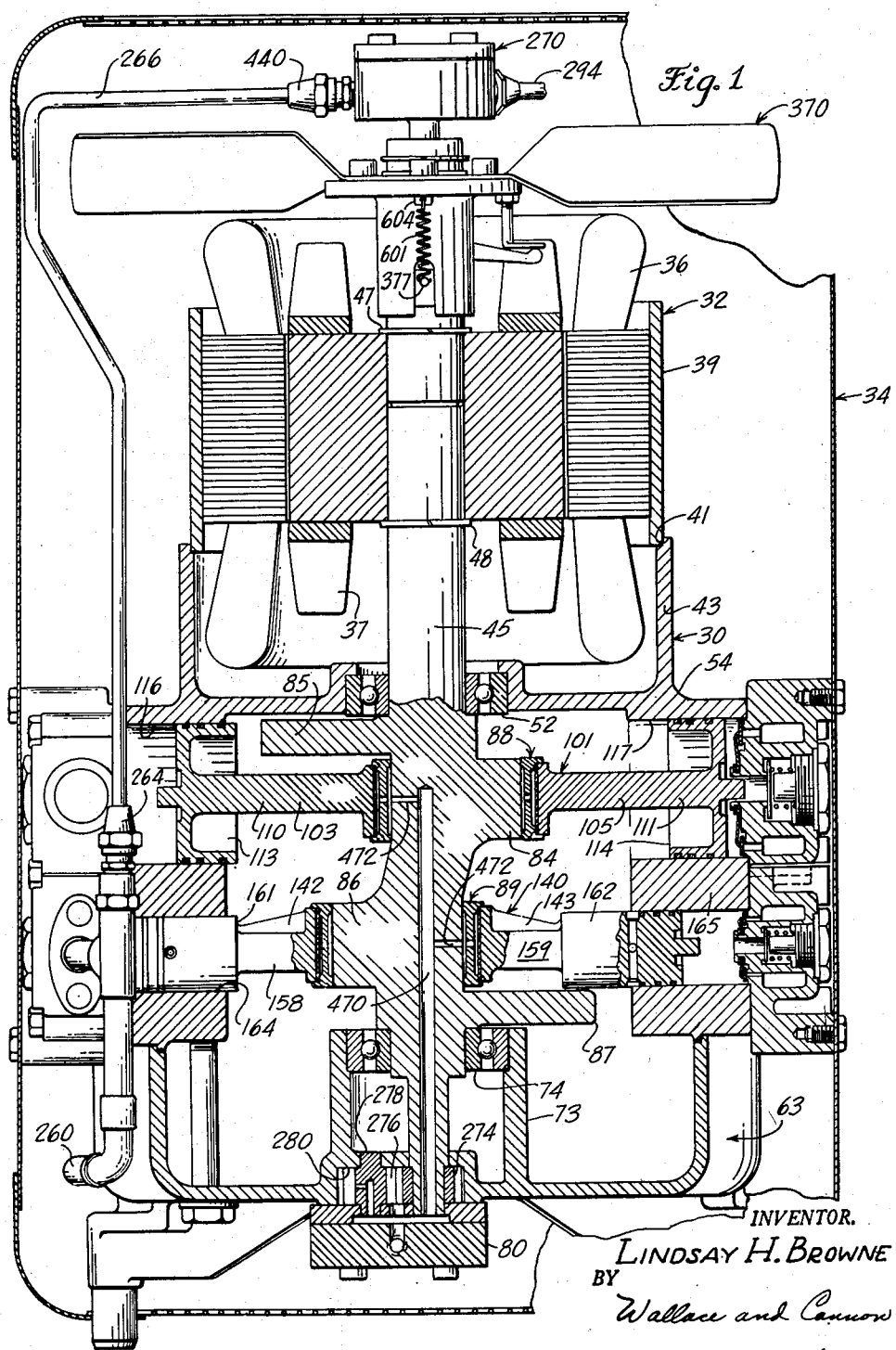
Fig. 1 is a vertical sectional view of a compressor of the kind with which my novel unloader may be associated and showing my novel unloader in association with such compressor.

The compressor with which my novel unloader is associated embodies a compressing unit that is driven by the motor generally indicated by 32 and which includes a stator 36 that is secured to the housing 39, the motor also including a rotor 37 which is keyed or otherwise suitably secured to the main drive shaft 45 of my novel compressor, snap rings 47 and 48 being effective to prevent longitudinal movement of the rotor along the shaft 45.

The casing 39 is supported from the casing 43 which houses the compressing means embodied in my compressor. This housing includes an upper end portion 54 in which a ball-bearing 52 is journaled and the shaft 45 is connected to the inner race of this ball-bearing. At the lower end of the casing 43 there is a sleeve 73 which supports a ball-bearing 74, and a reduced portion at the lower end of the shaft 45 is mounted in the inner race of this ball-bearing. Thus, the shaft 45 is mounted for rotation in the ball-bearings 52 and 74.

Two substantially oppositely disposed crank cams 84 and 86 are provided on the shaft 45 intermediate the ball-bearings 52 and 74. Counterweights 85 and 87 are also provided on this portion of the shaft 45.

A yoke 101 is mounted on the cam block 88 and the end portions 103 and 105 of this yoke afford substantially rigid connecting rods 110 and 111 which, respectively, carry the pistons 113 and 114, these pistons being reciprocal in diametrically opposed cylinders 116 and 117, respectively, the cylinders being afforded in the casing or housing 43.

Another yoke 140, similar to the yoke 101 is mounted on the cam block 89. The end portions 142 and 143 of the yoke 140 include substantially rigid connecting rods 158 and 159 which, respectively, carry pistons 161 and 162 that are respectively reciprocal in diametrically opposed cylinders 164 and 165 provided in the housing 43.

Suitable valve means such as those shown in section, in Fig. 1, are associated with the various cylinders, and these valve members function in the manner described in detail in my aforesaid co-pending application, Serial No. 12,610.

Air or other fluid that is compressed by the operation of my compressing unit flows through an aftercooler 260 and thence to its point of use, as for example, a storage tank.

The compressor with which my novel unloader is associated includes a pressurized lubricating system which embodies an oil pump 80. As shown in Fig. 1, this pump is of the gear type and includes a gear 274 keyed to the shaft 45. The gear 274 meshes with an idler gear 276 mounted on a bearing 278 carried by the base member 63 of my compressor. The gears 274 and 276 are mounted in a pocket 280. Oil pumped by the gears 274 and 276 is supplied to the lubricating system of my compressor which includes the passage 470 and passages as 472 leading therefrom to operative parts of the compressor.

My novel unloader 270 comprises an upper body member 398 and a lower body member 400, Figs. 2 and 3, connected together by suitable means such as bolts 402. The body members 398 and 400 have recesses 404 and 405 respectively formed therein. The recesses 404 and 405 are adjacent to each other but are separated by a flexible diaphragm 407 mounted between the upper and lower body members.

The lower body member 400 of the unloader 270 includes an outwardly projecting shaft 409 which is journaled in ball-bearings 411 and 412 mounted in the passageway 394 in the drive shaft 45, the lower bearing 412 seating on a shoulder 414 formed in the passageway 394 to limit movement of the unloader in a downward direction, as viewed in Fig. 2, and a snap ring 416 mounted in a suitable groove in the drive shaft 45 above the bearing 411 limiting movement of the unloader 270 in an upward direction.

The valve rod 396 extends through the shaft 409 into the recess 405, wherein it terminates in a valve head 418 which has an annular shaped flange 419 projecting from the lower face thereof. A valve disc 421, formed of suitable material such as a chlorabutadiene polymer, is mounted in the flange 419. The valve head 418 has a shoulder 422 formed in the outer peripheral edge portion thereof which is adapted to seat on an inwardly projecting flange 424 formed on a valve ring 426 mounted within the recess 405 concentrically to the valve head 418. The lower end portion of the ring 426, as viewed in Fig. 2, projects downwardly below the flange 424 to form a base 428, and the upper end portion of the ring 426 terminates in an outwardly projecting flange 430. A thrust plate 432 is seated upon the flange 430 below the diaphragm 407 for a purpose which will be discussed in greater detail hereinafter, and a compression spring 434 is positioned between the flange 430 and the base of the recess 405 to yieldingly urge the ring 426 and the thrust plate 432 toward the diaphragm.

A passageway 436, Figs. 2 and 4, is formed in the lower body member 400 of the unloader 270 and extends from the recess 405 outwardly through the side wall of the lower body member 400. A valve nipple 438 is mounted in the inner end portion of the passageway 436 and projects into the recess 405. A coupling member 440 is attached to one end portion of the tube 266 which extends from the aftercooler (not shown) of the compressor and this coupling is mounted in the outer end portion of the passageway 436, and thus it will be seen that communication is established between the aftercooler and the recess 405.

A substantially vertically extending passageway 442, as viewed in Fig. 2, is formed in the lower body member 400 of the unloader 270 and is in direct communication with a similar passageway 444 formed in the upper body member 398. The upper end portion of the passageway 444 is connected to the recess 404, above the diaphragm 407, by a passageway 446 formed in the upper body member 398, and the lower end portion of the passageway 442 is connected to the tube 294, extending from the oil pump 80, by a coupling 448 screwed into the lower body member 400.

Another passageway 450, Fig. 4, is formed in the lower body member 400, extending from the outer surface of the side wall thereof to the recess 405. A coupling 452, Fig. 4, is screwed into the outer end portion of the passageway 450 and is connected to one end of a tube 454, the other end of this tube (not shown) being open to the atmosphere. Thus it will be seen that an exhaust passage is provided by the passageway 450, the coupling 452 and the tube 454, from the recess 405 to the atmosphere.

A compression spring 456 is mounted in a recess 458 formed in the lower end portion of the shaft 409 on the body of the unloader 270, with one end portion engaged with the base of the recess 458 and the other end portion engaged with a washer 460 carried by and pinned to, the lower end portion of the valve rod 396. The spring 456 yieldingly urges the valve rod 396 downwardly into engagement with the short arm 386 of the lever 384.

A pin 462, carried by the hub 372 of the fan 370, is in alignment with the free end portion of the long arm 387 of the lever 392 and the downward urging of the valve rod 396 by the spring 456 is effective to yieldingly urge the lever 384 to rotate in a counter-clockwise direction, as viewed in Fig. 2, to thereby maintain the long arm 387 of the lever 384 in engagement with the pin 462.

Two tension springs as 601, Fig. 1, are connected between two bolts as 604 on the hub 372 of the fan 370 and the pin 377 and yieldingly urge the fan 370 toward the normal, lower, position shown in Figs. 1 and 2.

When my novel compressing unit is "at rest" in the vertical position shown in Figs. 1 and 2, the weight of the fan 370 together with the action of the springs as 601 holds the fan in the lower position shown in Figs. 1 and 2, to thereby hold the valve disc 421 off from the valve nipple 438 and thereby maintain an open passageway from the aftercooler 260 through the tube 266, the passageway 436, the valve nipple 438, the chamber 405, the passageway 450 and the tube 454 to the atmosphere, to thereby maintain the compressing unit in unloaded condition. However, when the compressing unit is being operated in a normal manner and at normal operating speeds, the air thrust on the fan 370 is sufficient to raise the fan against the stop ring 381 out of engagement with the lever 384, Fig. 3, and at this time the pressure of the oil pumped by the oil pump 80 through the tube 294 into the chamber 404 is effective to move the diaphragm 407 downwardly from the position shown in Fig. 2 to that shown in Fig. 3 to thereby move the thrust plate 418 and the ring 426 downwardly against the urging of the spring 434 and thus move the shoulder 424 down out of engagement with the valve head 418. This movement of the fan 370 and the shoulder 424 of the ring 426 frees the valve 418 for downward movement, and, therefore, the spring 456 is effective to move the valve 418 downwardly and thereby move the disc 421 into engagement with the valve nipple 438 to thereby close the passageway 436 and load the compressing unit.

At any time during the operation of my novel compressing unit if the speed of rotation of the drive shaft 45, and, therefore, if the fan 370 falls below a predetermined speed, or, if the pressure of the oil discharged by the oil pump 80 falls below a predetermined pressure, the spring 456 is rendered ineffective to maintain the valve disc 421 in closed position on the valve nipple 438 and the compressing unit is unloaded. Thus it will be seen that my novel unloader 270 comprises an effective means for maintaining my novel compressing unit unloaded during the starting thereof until the speed of operation and the oil pressure have raised to their normal amounts, and also comprises a safety unit for unloading the compressor during operation of my compressing unit if either the speed of operation or the oil pressure falls below a predetermined amount.

When my novel compressing unit is mounted in the previously discussed horizontal position for operation, the operation of the unloader 270 is substantially the same as when the compressing unit is in the vertical position just discussed, the principle difference being that the springs 601 and 602, unassisted by the force of gravity on the fan 370 are relied on to hold the fan 370 in normal, lowered, position.

A modified form of unloader 270a, adapted to be used on my novel compressor, is shown in Figs. 5, 6 and 7 where parts which are similar to parts described hereinabove are indicated by the same reference numerals with the suffix "a" added thereto.

As is best seen in Figs. 6 and 7, the unloader 270a comprises an upper body member 398a having a recess 404a formed therein, and a lower body member 400a having a recess 405a formed therein and a shaft 409a extending therefrom. The two body members are held together by bolts 402a and a diaphragm 407a is positioned between the two body members.

The lower body member 400a has an inlet passageway 436a formed therein having an enlarged chamber 500 opening into the recess 405a. The chamber 500 has two valve seats 502 and 504 formed therein and a valve 505, having two heads 507 and 508, adapted to seat on the valve seats 502 and 504, respectively, is mounted on the upper end portion of a valve rod 396a. A spring 456a, mounted in the shaft 409a and engaged with a washer 460a on the valve rod 396a, urges the rod 396a and, therefore, the valve 505 downwardly and thereby tends to maintain the valve heads 507 and 508 in engagement with the valve seats 502 and 504. The passageway 436a is adapted to receive the coupling member 440 on the tube 266 extending from the aftercooler 260 of the compressor.

An outlet passageway 450a, adapted to be connected to the coupling member 452 on the exhaust tube 454, is also formed in the lower body member 400a and is connected to the recess 405a by a passageway 510, and to an extension chamber 512 of the enlarged chamber 500 by a passageway 514.

A valve ring 426a having a shoulder 430a, a flange 424a, and a base 428a is mounted within the recess 405a on a compression spring 434a. A thrust plate 432a rests on the shoulder 430a below the diaphragm 407a, and a valve plate 418a mounted on the upper end portion of the valve 505 is adapted to be engaged by the flange 424a.

Another passageway 442a, adapted to be connected to the coupling member 448 on the end of the oil tube 294 which extends from the oil pump 80, is formed in the lower body member 400a and is connected to the recess 404a by a passageway 446a.

Two bearings 411a and 412a are mounted on the shaft 409a whereby the unloader 270 may be journaled in the upper end portion of the camshaft 45 of my novel compressor.

The modified form 270a of my unloader operates in substantially the same manner as the unloader 270, with the exception that the valve 500 is of the so-called "balanced valve" type, whereby the pressure of the air in the passageway 436a exerts substantially equal opposite forces on the valve heads 507 and 508 to thereby eliminate the tendency of the air pressure to unseat the valve 500. Also it will be seen that unlike the unloader 270, when the valve 500 is in open or "unloading" position, air can pass from the passageway 436a through both the passageways 510 and 514 to the passageway 450a.

From the foregoing it will be seen that I have provided an unloader which is responsive both to the speed of operation of the compressor with which it is associated and the pressure of lubricant in a forced feed lubricating system of the compressor.

Hence, my novel unloader enables the hereinabove set forth and kindred objects of this invention to be realized and, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An unloader of the type adapted to be used on a compressor having an oil pump, comprising a valve operable in one position to effect loading of such a compressor and out of said position to effect unloading of said compressor, means adapted to move said valve into said one position, said means including a spring connected to said valve and fluid pressure actuated means responsive to oil under pressure from the oil pump of such a compressor during the operation of the latter, and other means including a second spring and a lever disposed in position to operatively engage said valve for rendering said first named means inoperative to move said valve into said one position when either the speed of operation of the compressor is below a predetermined speed or the pressure of the oil discharged by the pump of the compressor is below a predetermined pressure, said other means being ineffective to render said first named means inoperative to move said valve to said one position when the speed of the compressor is above a predetermined speed and the pressure of the oil discharged by the oil pump of the compressor is above a predetermined pressure.

2. In an unloader of the type adapted to be used with a compressor having a drive shaft rotatably mounted therein, a fan slidably mounted on said drive shaft for rotation therewith, and an oil pump connected to said drive shaft and operable to pump oil under pressure upon rotation of said drive shaft, the combination of a housing having a chamber formed therein, a valve reciprocably mounted in said chamber, said valve being operable in one position to effect loading of such a compressor and out of said position to effect unloading of such a compressor, means adapted to move said valve into said one position, said means including a spring connected to said valve and urging said valve toward said one position, a thrust plate movably mounted within said chamber, and a flexible diaphragm engaged with said thrust plate and responsive to oil under pressure from the oil pump upon operation of the latter to move said thrust plate toward said valve, and other means for rendering said first named means inoperative to move said valve into said one position when either the speed of rotation of the fan of the compressor is below a predetermined speed or the pressure of the oil discharged by the oil pump of the compressor is below a predetermined pressure, said other means including an annular shaped member engageable with said thrust plate and having a shoulder engageable with said valve, a second spring engaged with said annular shaped member and urging said thrust plate and said valve away from said one position, and a lever engageable with said valve and adapted to be controlled by the fan of the compressor, said other means being ineffective to render said first named means inoperative to move said valve to said one position when the speed of rotation of the fan of the compressor is above said predetermined speed and the pressure of oil discharged by the oil pump of the compressor is above said predetermined pressure.

3. An unloader of the type adapted to be used on a compressor having an oil pump, comprising a valve operable in one position to effect loading of such a compressor and out of said position to effect unloading of said compressor, means operable to move said valve into said one position, said means including a spring connected to said valve and a diaphragm responsive to oil under pressure from the oil pump of such a compressor during the operation of the latter, and other means for rendering said first named means inoperative to move said valve into said one position when either the speed of operation of the compressor is below a predetermined speed or the pressure of the oil discharged by the pump of the compressor is below a predetermined pressure, said other means including a second spring, operatively connected to said valve in opposition to said first named spring, a fan rotatable by said compressor, said fan being slidable longitudinally to the axis of rotation in response to changes in rotative speeds thereof, and a lever engageable with said fan and said valve, said other means being ineffective to render said first named means inoperative to move said valve to said one position when the speed of the compressor is above a predetermined speed and the pressure of the oil discharged by the oil pump of the compressor is above a predetermined pressure.

4. In a compressor comprising a base, a housing mounted on said base and embodying oppositely disposed cylinders, pistons reciprocably mounted in said cylinders, valve means for controlling the flow of working fluid into and out of said cylinders, discharge means connected to said cylinders, a drive shaft rotatably mounted in said housing, means connected to said drive shaft and said pistons for reciprocating said pistons in said cylinders upon rotation of said drive shaft, a motor mounted on said drive shaft for rotating the latter, an oil pump connected to said drive shaft for operation thereby, and a fan slidably mounted on said drive shaft for rotation therewith, an unloader connected to said discharge means and operative to open and close said discharge means to the atmosphere, conduit means operatively connecting said unloader to said oil pump, and lever means operatively connecting said unloader to said fan, said unloader being operative to maintain said discharge means open to the atmosphere when the speed of rotation of said fan is below a predetermined speed or the pressure of the oil pumped by said oil pump is below a predetermined pressure and being adapted to close said discharge means to the atmosphere when the pressure of the oil pumped by said oil pump is above a predetermined pressure and the speed of rotation of said fan is above a predetermined speed.

5. In a compressor comprising a housing embodying diametrically opposed cylinders, pistons reciprocably mounted in said cylinders for compressing working fluid therein, a drive shaft extending between said opposed cylinders substantially transversely thereto, means intermediate said drive shaft for reciprocating said pistons in said cylinders upon rotation of said drive shaft, valve means controlling the intake and exhaust of working fluid relative to said cylinders, discharge means connected to said cylinders for passing working fluid therefrom, and an oil pump connected to said drive shaft and operable thereby upon rotation of the latter, an unloader including a body having a chamber therein and a flexible diaphragm extending across and dividing said chamber, means including a passageway formed in said body for establishing communication between said discharge means and said chamber on one side of said diaphragm, a valve seat carried by said body at one end of said passageway, means including a passageway formed in said body for establishing communication between the atmosphere and said chamber on said one side of said diaphragm, means including a passageway formed in said body for establishing communication between said oil pump and said chamber on the other side of said diaphragm through which said oil pump is effective to discharge oil under pressure into said chamber during rotation of said drive shaft, a valve reciprocably mounted in said body and operable to be moved into and out of engagement with said valve seat, said valve being operable when in engagement with said valve seat to close said first named passageway and thereby close communication between said discharge means and said chamber, a spring yieldably urging said valve away from said seat, a second spring urging said valve toward said valve seat, said second spring being weaker than said first mentioned spring, a lever pivotally mounted on said drive shaft and having one end in engagement with said valve, a fan slidably mounted on said drive shaft for rotation therewith and engageable with the other end of said lever, said fan normally engaging said other end of said lever and urging said valve away from said valve seat, said fan being so disposed on said shaft that during rotation of said drive shaft said fan is urged to slide away from said lever, said fan and said first mentioned spring being effective to hold said valve off of said valve seat when the pressure of the oil discharged into said chamber by said oil pump is below a predetermined pressure, or when said drive shaft is rotating at less than a predetermined speed, said fan and said spring being rendered ineffective to hold said valve out of engagement with said valve seat when the pressure of the oil discharged into said chamber is above said predetermined pressure and when the drive shaft is rotating at more than said predetermined speed.

6. The combination defined in claim 5 and in which said first mentioned means including a passageway includes a second valve seat extending around a portion of said passageway, and in which said valve includes two head portions disposed in position for movement into and out of sealing engagement with respective ones of said valve seats on the sides thereof adjacent said chamber during said operable movement of said valve, and in which said second mentioned means including a passageway includes another passageway connected to said last mentioned passageway and connected to said first mentioned passageway on the opposite side of said second valve seat from said chamber.

7. An unloader of the type adapted to be mounted on an air compressor of the type including a discharge conduit for air compressed by the compressor, a rotatable drive shaft and a fan mounted on one end portion of said drive shaft for rotation therewith, said fan being slidably mounted on said drive shaft for movement longitudinally relative thereto, said unloader comprising an elongated housing having one end portion adapted to be mounted in said one end portion of said drive shaft, a chamber defined in the other end portion of said housing, a diaphragm extending across said chamber and separating one end portion of said chamber from the other end portion thereof, a conduit extending through said other end portion of said housing into said other end portion of said chamber and adapted to connect said other end portion of said chamber to said discharge conduit, of such a compressor, a second conduit extending through said other end portion of said housing into communication with said other end portion of said chamber and connecting said other end portion of said chamber to the atmosphere, a third conduit extending through said other end portion of said housing into communication with said one end portion of said chamber and adapted to connect said one end portion of said chamber to the oil pump of such a compressor, an elongated valve extending through said one end portion of said housing and having a valve head mounted in said other end portion of said chamber, said valve being movable longitudinally of said housing into and out of engagement with said first mentioned conduit to thereby open and close said conduit and control the loading and unloading of such a compressor, a compression spring operatively connected to said valve and urging said valve away from said first mentioned conduit, means engaged with said diaphragm for urging said valve toward said conduit, a lever adapted to be pivotally mounted in said drive shaft with one end of said lever disposed in engagement with one end portion of said valve and the other end portion of said lever projecting outwardly from said diaphragm first into position for engagement with such a fan when said fan moves through a predetermined path of movement on said drive shaft longitudinally of the latter, for restraining the movement of said valve toward said valve seat, and a spring mounted in said housing and connected to said valve for urging said valve into engagement with said first mentioned conduit, said last mentioned spring being ineffective to move said valve into engagement with said first mentioned conduit against the urging of said first mentioned spring and the restraint of said fan on said lever when the pressure of oil fed into said one end portion of said chamber is below a predetermined pressure or the speed of rotation of said drive shaft is below a predetermined speed.

LINDSAY H. BROWNE.

References Cited in the file of this patent

UNITED STATES PATENTS

| Number | Name | Date |
|---|---|---|
| 2,047,489 | Pfeifer | July 14, 1936 |
| 2,137,219 | Aikman | Nov. 22, 1938 |
| 2,211,875 | Aikman | Aug. 20, 1940 |
| 2,445,527 | Hirsch | July 20, 1948 |